United States Patent
Yeung et al.

(10) Patent No.: US 10,577,264 B2
(45) Date of Patent: Mar. 3, 2020

(54) PULSED ELECTRIC FIELD FOR DRINKING WATER DISINFECTION

(71) Applicant: THE HONG KONG UNIVERSITY OF SCIENCE AND TECHNOLOGY, Hong Kong (CN)

(72) Inventors: King Lun Yeung, Hong Kong (CN); Joseph Kai Cho Kwan, Hong Kong (CN); Siu Ming Kwan, Hong Kong (CN); Ka Wo Lam, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 199 days.

(21) Appl. No.: 14/442,588

(22) PCT Filed: Nov. 21, 2013

(86) PCT No.: PCT/CN2013/001426
§ 371 (c)(1),
(2) Date: May 13, 2015

(87) PCT Pub. No.: WO2014/079149
PCT Pub. Date: May 30, 2014

(65) Prior Publication Data
US 2016/0280569 A1    Sep. 29, 2016

Related U.S. Application Data

(60) Provisional application No. 61/796,832, filed on Nov. 21, 2012.

(51) Int. Cl.
C02F 1/48     (2006.01)
C02F 1/467    (2006.01)
C02F 1/461    (2006.01)

(52) U.S. Cl.
CPC ............ *C02F 1/48* (2013.01); *C02F 1/46109* (2013.01); *C02F 2001/46133* (2013.01);
(Continued)

(58) Field of Classification Search
CPC ................... C02F 1/46109; C02F 1/48; C02F 2001/46133; C02F 2001/46152;
(Continued)

(56) References Cited

U.S. PATENT DOCUMENTS 3,923,629 A * 12/1975 Shaffer ............... C02F 1/46109
                                                      204/260
6,093,432 A *  7/2000 Mittal ...................... A23C 3/00
                                                      422/186.04
(Continued)

FOREIGN PATENT DOCUMENTS

JP         2000-166523       *  6/2000

*Primary Examiner* — Salil Jain
(74) *Attorney, Agent, or Firm* — Nath, Goldberg & Meyer; Joshua B. Goldberg; Daniel Bissing

(57) ABSTRACT

The present disclosure relates to a micro-mini pulsed electric field (PEF) device for point-of-use disinfection of drinking water. The pulsed electric field device comprises micro-engineered electrodes and a low-voltage pulsed electric field generator circuit. A pulsed electric field is generated across a micro-gap between the electrodes to achieve disinfection of drinking water.

21 Claims, 7 Drawing Sheets

(52) U.S. Cl.
CPC ............... *C02F 2001/46152* (2013.01); *C02F 2201/46125* (2013.01); *C02F 2201/46175* (2013.01); *C02F 2201/48* (2013.01); *C02F 2303/04* (2013.01); *C02F 2307/10* (2013.01); *C02F 2307/12* (2013.01)

(58) Field of Classification Search
CPC .. C02F 2201/46125; C02F 2201/46175; C02F 2201/48; C02F 2303/04; C02F 2307/10; C02F 2307/12
See application file for complete search history.

(56) References Cited

U.S. PATENT DOCUMENTS

| | | | | |
|---|---|---|---|---|
| 2002/0139668 | A1* | 10/2002 | Bhullar | G01N 27/403 204/403.02 |
| 2003/0042134 | A1* | 3/2003 | Tremblay | C02F 1/46104 204/228.1 |
| 2004/0084381 | A1* | 5/2004 | Korenev | A23L 3/32 210/748.01 |
| 2005/0026202 | A1* | 2/2005 | Edman | B01J 19/0046 435/6.11 |
| 2005/0112544 | A1* | 5/2005 | Xu | C12M 23/12 435/4 |
| 2005/0156499 | A1* | 7/2005 | Dinu | G02F 1/065 313/310 |
| 2006/0052826 | A1* | 3/2006 | Kim | A61N 1/0558 607/2 |
| 2006/0115712 | A1* | 6/2006 | Kim | B82Y 30/00 429/483 |
| 2009/0053813 | A1* | 2/2009 | Evans | B01J 19/0046 435/461 |
| 2012/0070338 | A1* | 3/2012 | Schaeffer | A61L 2/035 422/22 |
| 2013/0213898 | A1* | 8/2013 | Grunwald, Jr. | C02F 1/48 210/748.01 |
| 2015/0075992 | A1* | 3/2015 | Cui | C02F 1/4608 204/674 |

* cited by examiner

Positive electrodes (+)

Negative electrodes (+)

Insulator

Metal electrodes on both sides (+ & -)

Water flow direction

E-field direction

PULSED ELECTRIC FIELD FOR DRINKING WATER DISINFECTION

FIELD

The present disclosure relates generally to the field of drinking water disinfection, and a device that disinfects microorganisms in drinking water by generating a pulsed electric field between micro-engineered electrodes immersed in the water.

BACKGROUND

Clean drinking water supplies are considered a major public health milestone of our generation. However, waterborne diseases are still the third leading cause of death. The Word Health Organization (WHO) reported that diarrheal disease from unsafe water kills 1.5 million children each year and causes two billion cases of illness worldwide (WHO Diarrhoeal disease, fact sheet No 330). The problem is expected to be exacerbated by climate change (Gleick et al., 2010). A recent study shows that rich and well-developed countries with established municipal drinking water treatment and distribution systems are also vulnerable to waterborne pathogens. Reynolds and Gerba showed that from 1971 to 2002 there were 764 documented disease outbreaks related to drinking water in the United States of America resulting in roughly 0.6 million cases of illness and 79 fatalities (Reynolds et al., 2008 and Reynolds et al., 2011). They estimated that in the U.S.A. alone 26 million cases of infection and 13 million cases of illness each year are associated with unsafe municipal water caused by the inadequacy of treatment plants, contamination of water sources and intrusions into water distribution systems.

Drinking water distribution systems harbor rich microbial communities and the conventional method of using residual disinfectants is often ineffective in controlling the microbial growth (Servais et al., 1995, Kilb et al, 2003, Wingender et al, 2004 and Berry et al., 2006). Many problems in drinking water distribution systems are microbial in nature, from biofilm growth to water nitrification, corrosion, and persistence of pathogens (Camper et al., 2004, Emtiazi et al., 2004, Regan et al., 2003 and Beech et al., 2004). Although most of the microorganisms found in drinking water distribution systems belong to autochthonous aquatic microflora (Bagh et al., 2004), which are considered to be harmless, many studies have shown that drinking water biofilms can harbor opportunistic pathogens harmful to humans (Flemming et al., 2002, Szewzyk et al., 2000 and LeChavallier et al., 1996). Indeed, many waterborne pathogens are known to persist and reproduce in the drinking water distribution systems and are responsible for causing infections of gastrointestinal tract, skin and lymph nodes. *Legionella pneumophila, Pseudomonas aeruginosa, Aeromonas* sp and *Mycobacterium* sp are among the pathogens found in tap water in homes, public buildings and hospitals (Stojek et al., 2008, Armon et al., 1997, Moritz et al., 2010, Sen et al., 2004, Mazari-Hiriart et al., 2005, Kunimoto et al., 2003 and Dailloux et al., 2003). The situation is aggravated by the growing occurrence of antibiotic resistant genes in drinking water biofilms responsible for vancomycin-resistance (vanA) and beta-lactamase activities (Schwartz et al., 2003). Furthermore, many bacteria can transform into ultramicrocells (Silbaq et al., 2009) or enter into a viable but non-culturable state in response to environmental stress making surveillance and detection difficult (Oliver et al., 2005).

Microorganisms can colonize and form complex microbial ecosystems on all surfaces of drinking water distribution systems that are in contact with water (Vaerewijck et al., 2005). The age, construction and materials of the water distribution system affect biofilm formation and dynamics (Lautenschlager et al., 2010, Bolton et al., 2010 and Moritz et al., 2010). It has been shown that the diverse microbial community found in drinking water systems can increase microbial resistance to chemical disinfection. Studies have clearly demonstrated that maintaining a residual level of chemical disinfectant in drinking water distribution systems is ineffective in controlling microbial growth (Servais et al., 1995, Kilb et al, 2003, Wingender et al, 2004 and Berry et al., 2006). Higher chlorination combined with frequent flushing is shown to alleviate but not completely solve, the microbial problem (Besner et al., 2008). However, chlorination can produce unwanted byproducts such as chloromethane with its own health implications (Sohn et al., 2004). The same issue problem exists with ozone treatment in it produces byproducts, which byproducts as well as the ozone itself, have adverse health implications. (Galapate et al., 2001). UV disinfection at point-of-use has been proposed (Cristea et al., 2009), but at a significantly higher cost, and turbidity from gas bubbles can significantly reduce its effectiveness (Sommer et al., 2000). Also, cellular repair mechanisms limit its efficiency as shown by a study that reports Gram-negative Enterobacteriaceae (i.e., coliforms and enterococci) exhibit high rate of regrowth after UV disinfection (Sommer et al., 2000). A recent study also shows UV irradiation can induce competence in *Legionella pneumophila* allowing the bacteria to acquire and propagate foreign genes, contributing to its emergence as pathogen (Charpentier et al., 2011). Point-of-use water filters are reported to be effective in reducing *Legionella pneumophila* and *Mycobacterium* in water fixtures (Sheffer et al., 2005), but a more recent study shows that water filters are also vulnerable to microbial colonization (Chaidez et al., 2004). Heterotrophic plate count (HPC) bacteria, faecal coliforms, acid-fast organisms (Mycobacteria spp.) as well as opportunistic pathogens such as *Aeromonas hydrophila, Plesiomonas shigelloides* and *Pseudomonas aeruginosa* are reported to thrive in filtered water samples. The study concluded that many of the point-of-use filter devices may amplify the number of bacteria present in the tap water by promoting biofilm growth. Furthermore, current filtration technology cannot treat ultramicrocells in drinking water (Silbaq et al., 2009).

Pulsed electric field (PEF) treatment has been successfully used for water disinfection (Espino-Cortes et al., 2006, Uchida et al., 2008, Riedel et al., 2008 and Duda et al., 2011). The technology was first used for non-thermal sterilization pharmaceuticals (Goldberg et al., 2009) and food products (e.g., fruit juices, beer, milk and cream) (Rastogi et al., 2003 and Wan et al., 2009). In general, it was observed that Gram-negative bacteria (e.g., *Escherichia coli* or *Pseudomonas aeruginosa*) and yeast cells are much easier to kill than Gram-positive bacteria (e.g., *Staphylococcus aureus* or *Enterococcus faecium*) (Min et al., 2007). This higher resistance of Gram-positive bacteria to PEF is believed to be related to the cell wall composition of Gram-positive bacteria. PEF treatment can also sterilize bacterial spores and mold ascospores (Marquez et al., 1997 and Choi et al., 2008).

Inactivation of microorganisms by PEF relies on electroporation of the cellular membrane when an external electric field is applied (Sale et al., 1967 and Timoshkin et al., 2004). The accumulation of charges on the cell membrane eventually develops into a transmembrane potential that increases cell permeability and in severe cases lead to an irreversible breakdown of the cell. Electroporation is reported to occur at a transmembrane potential of 0.5 V and cell lysis near 1.5 V (Fox et al., 2005). Even sub-lethal injuries caused by PEF treatment is reported to render the microorganism nonviable within an hour of the treatment (Garcia et al., 2005). Reports also suggest PEF can decrease the activity of various enzymes including lipase, glucose oxidase, amylase, peroxidase and polyphenol oxidase (Ho et al., 1997), and could explain the observed change in the respiratory activity of PEF-treated bacteria (Podolska et al., 2009). Unlike thermal and UV treatment, PEF treatment does not induce competence in bacteria population (Riedel et al., 2008).

A number of PEF systems operating at high voltages have been used for microbial disinfections (U.S. Pat. Nos. 6,379,628, 6,083,544, 7,059,269, 6,746,613, and U.S. Patent Application Publication No. 2010/0112151). Although these devices show promising antimicrobial performance, they are unsuitable for point-of-use disinfection of drinking water from the tap due to the high voltage needed to operate effectively.

SUMMARY

In one aspect, the present subject matter relates to a device for point-of-use disinfection of water comprising a plurality of micro-engineered electrodes having a micro-gap between the micro-engineered electrodes; a power supply; a control system; and a low-voltage pulsed electric field generator circuit responsive to the control system, to generate a pulsed electric field strength across the micro-gap of the micro-engineered electrodes, thereby providing the pulsed electric field strength at a level effective to increase cell permeability and/or cause an irreversible damage to cells of microorganisms present in the water.

In another aspect, the present subject matter relates to a method for point-of-use disinfection of water comprising providing a plurality of micro-engineered electrodes having a micro-gap between the micro-engineered electrodes; and generating a pulsed electric field strength, across the micro-gap of the micro-engineered electrodes to provide the pulsed electric field strength at a level effective to increase cell permeability and/or cause an irreversible damage to cells of microorganisms present in the water.

BRIEF DESCRIPTION OF DRAWINGS

The accompanying diagrams and figures illustrate and explain several characteristics of the present disclosure.

DETAILED DESCRIPTION

Applicants describe herein a novel micro-mini pulsed electric field device (also called an micro-engineered pulsed electric field device) for disinfection of drinking water comprising a low voltage pulsed electric field generator circuit and micro-engineered electrodes to disinfect microorganisms found in drinking water. An advantage of the present device is that disinfection is achieved while avoiding the excessive use of chemical disinfectants and biocides that could potentially induce resistance and tolerance in microorganisms and possibly alter the taste and quality of the drinking water. The device can be applied not only in a domestic situation, but also in public, commercial and industrial premises where safe drinking water is paramount.

As used herein, "disinfection" is defined as at least 90% reduction of the number of microorganisms (e.g., the number of colony forming units (CFU) of bacteria) in a sample of water. The disinfection of microorganisms is generally achieved by application of an electric field to the cell wall of microorganisms captured within the electric field. The electric field induces an increase in cell permeability (e.g., pore formation) of the cell wall of the microorganism, and thus causes an irreversible damage to the microorganism through a combination of cell wall collapse, osmotic stress and enhanced transport of residual disinfectants (e.g., chlorine) in water.

Overview

Figure 13:
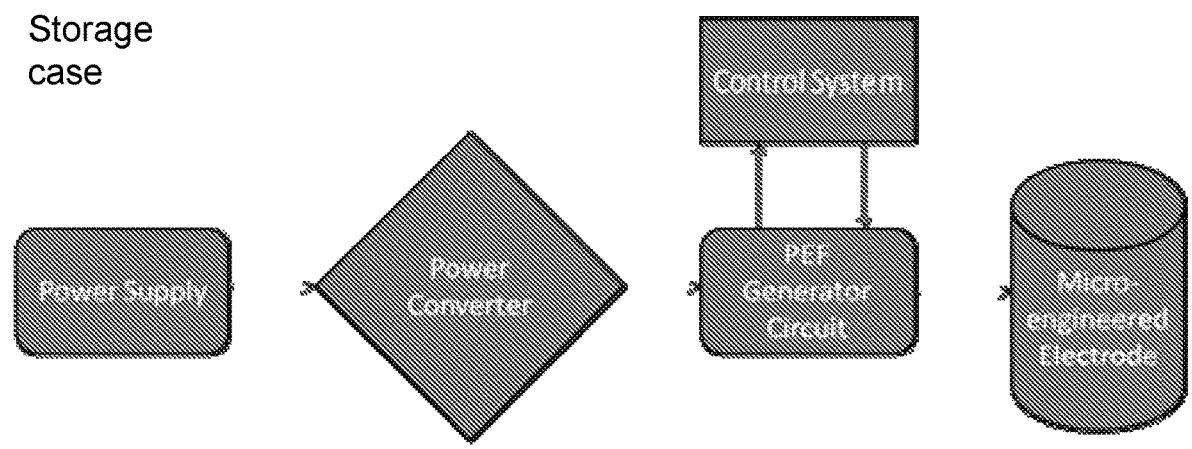
FIG. 13 is a schematic diagram showing a typical device for point-of-use disinfection of water according to the present disclosure.

The present disclosure is directed to a point-of-use drinking water disinfection device. The various designs described herein are merely non-limiting examples and it is contemplated that other such designs can be created using design software, e.g., SolidWorks and AutoCAD, and manufactured by a general industrial process A typical device for point-of-use disinfection of water according to the present subject matter comprises at least a low voltage pulsed electric field generator circuit, micro-engineered electrodes, control system, power supply, and a storage case. The device may further comprise a power converter. A schematic diagram of a non-limiting, exemplary device is shown in FIG. 13. According to FIG. 13, briefly, AC is the preferred power supply. When AC power passes through the converter unit, it is converted into DC power, which can power the PEF generator circuit. The control system is used to control the ON/OFF of the pulse generated by the PEF generator circuit, which pulse is then transmitted to the micro-engineered electrode.

The device can be a stand-alone unit or a tap-mounted unit for point-of-use disinfection of drinking water. A typical stand-alone device has dimensions ranging from 200 mm×200 mm×200 mm to 300 mm×300 mm×300 mm; and a tap-mounted unit has dimensions ranging from 30 mm×30 mm×30 mm to 80 mm×80 mm×80 mm. An option for tap-mounted unit is an internal rechargeable battery unit to be powered by a dynamo located in the drain through which water is flowing.

Micro-Engineered Electrode System

A micro-engineered electrode system (also referred to as a mini-micro electrode system) is designed to generate intense electric field at low voltage. The electrodes are made of a conducting material or a carbon-based material. Conducting materials of which the electrodes may be made include as non-limiting examples, metals and metal alloy such as stainless steel, aluminum and aluminum alloys, titanium and titanium alloys, copper and copper alloys, tungsten and tungsten alloys, ceramic, glasses and intermetallics including composites such as a metal-metal alloy composite, and coatings thereof. A metal-metal alloy composite can be any combination/mixture of metals, e.g., Fe(Iron)-Al(Aluminium). Non-limiting examples of carbon-based materials of which the electrodes may be made include conducting polymers, carbons, graphite, graphene and carbon nanotubes, including composites and coatings thereof. A carbon-based material composite can be a combination/mixture of the above carbon-based materials, e.g., mixture of graphene with graphite, graphene with carbon nanotubes. Such a carbon-based material composite may also be applied as coating.

A micro-gap having a dimension ranging from about 10 μm up to about 300 μm, or from about 50 μm to about 150 μm, is maintained between the electrodes. A physical separation between the microelectrodes is achieved by (a) use of a physical barrier optionally, but not restricted to, insulating materials such as acrylonitrile butadiene styrene, poly(methyl methacrylate), poly(vinyl chloride), polycarbonate, polyphenylsulfone polymer or similar polymer materials; (b) use of a non-electrical conducting protective layer on metal electrodes by electrophoretic deposition, for example by electropolymerization, anodization and electrocoating (e-coating) process; (c) use of microfabrication technology in electrode manufacture to systematically locate and position the electrodes on a solid substrate. A person of skill in the art would readily appreciate what microfabrication techniques are used in the fabrication of electronic devices. Typically, microfabrication techniques involve chemical deposition, photoresist coating, photolithography, patterning and etching.

In terms of the installation of the electrode system within the device, the electrode system, could be installed such that the direction of the electric field generated is either perpendicular or parallel to the water flow.

Low-Voltage Pulsed Electric Field Circuit

A low-voltage pulsed electric field generator with voltage input of less than about 30 V, in particular between about 5 V up to about 20 V, is designed to generate pulsed electric field strength of at least about 0.5 kV/cm to about 20 kV/cm, for example, about 3 kV/cm to about 10 kV/cm. This range of electric field intensity can effectively disinfect drinking water from the tap. The pulsed electric field generator circuit comprises primarily of electrical components including, but not limited to, resistors, capacitors, amplifier, logic gate and IC chips etc. The pulsed electric field generated from the circuit can be simulated by computer software before actual fabrication. The pulsed electric field generated from the circuit has a pulsed waveform, which could be square, sinusoidal, trapezoidal, triangular, etc.

Performance of Micro-Mini Pulsed Electric Field Device

Performance of the micro-mini pulsed electric field device was evaluated as is discussed below with respect to Examples 12 and 13. Tap water containing known concentration of *Escherichia coli* (*E. Coli*) was contacted with the different micro-engineered electrode systems in various operating conditions such as different pulse width, pulse frequency, waveform, pulse strength and pulse duration. The low-voltage pulsed electric field circuit generated the pulse and passed to the electrode system for electric field generation. The anti-microbial efficiency was then calculated, in terms of percentage, by counting the *Escherichia coli* remaining after the disinfection process.

EXAMPLES

Example 1: Micro-Engineered Porous Electrode System (Design 1, Perpendicular Electric Field)

Figure 1:
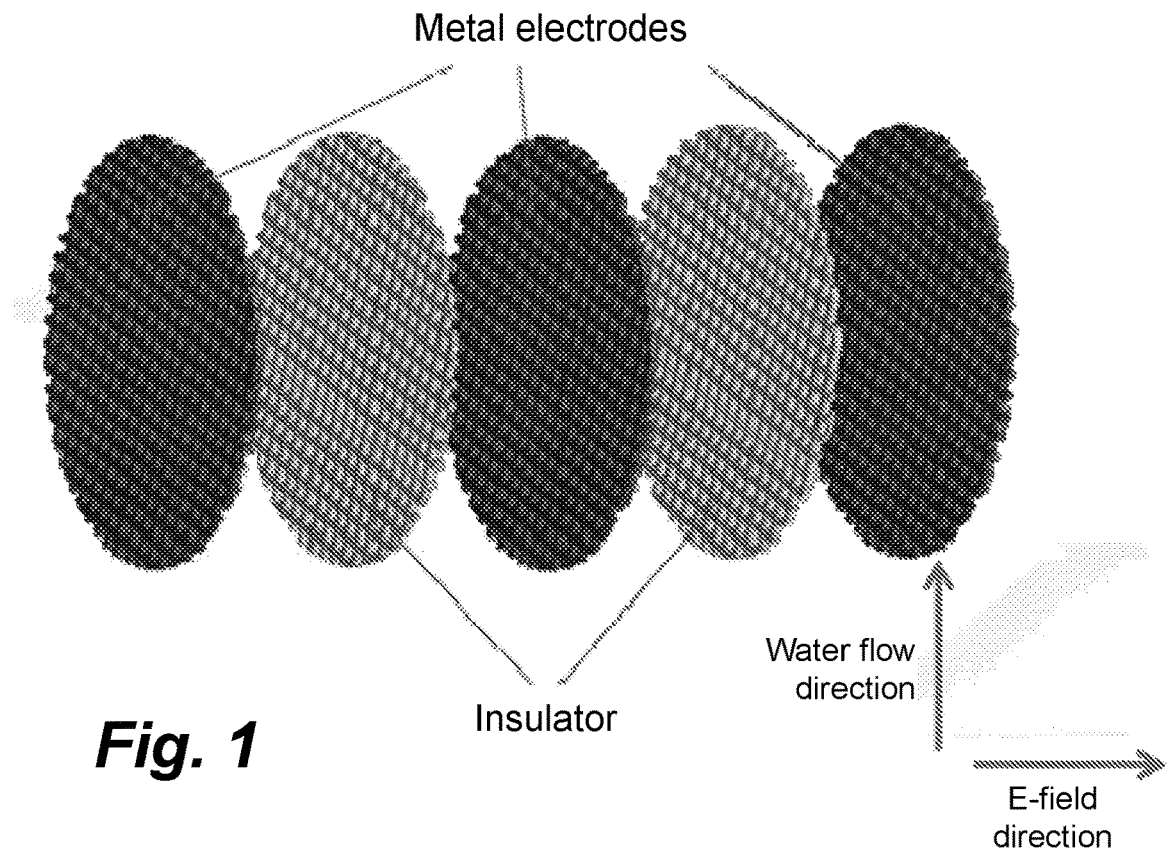
FIG. 1 is a schematic diagram showing a micro-engineered porous electrode system with the installation showing water flow direction perpendicular to the electric (E-) field direction.

FIG. 1 is a non-limiting schematic diagram showing a micro-engineered porous electrode system (Design 1). The system is installed so that the direction of electric field is perpendicular to the direction of tap water flow. The electrodes in this non-limiting example are in the form of a mesh, but it is also contemplated that the electrodes are in the form of a screen, perforated plates or foils, porous plates and foils, fabrics, papers, micropatterned foils or any materials containing through porosity. Mesh size is defined as the number of squares in one inch horizontally and vertically. Mesh sizes ranging from about 20 mesh to about 200 mesh are suitable. In certain embodiments the mesh size are 40 mesh, 50 mesh or 100 mesh. The electrode materials in this non-limiting example are metals or their alloys, particularly stainless steel, aluminum, brass, titanium and tungsten. It is also contemplated that the electrode materials could be conducting carbons, polymers, ceramics and intermetallics including composites and coating thereof.

A porous barrier made of insulating material with a maximum thickness of 100 μm is used to create a micro-gap between the electrodes as shown in FIG. 1. In alternative, the barrier could be a non-electrical conducting protective layer of less than 100 μm deposited on the electrodes surface by electrophoretic deposition process (e.g., anodization or E-coating) depending on the electrode material, so that the physical barrier could be omitted. The micro-engineered porous electrodes can have a minimum of two electrodes with or without a separator, but more electrode-separator pairs are contemplated. The number of electrode-separator pairs are constrained mainly by the optimal overall thickness of 10 mm and water pressure drop of not more than 10%. An example of micro-engineered electrodes comprises up to 20 electrode-separator layers with diameter of 10 mm and thickness of 10 mm.

Example 2: Micro-Engineered Multi-Rod Electrode System (Design 2, Perpendicular Electric Field)

Figure 2:
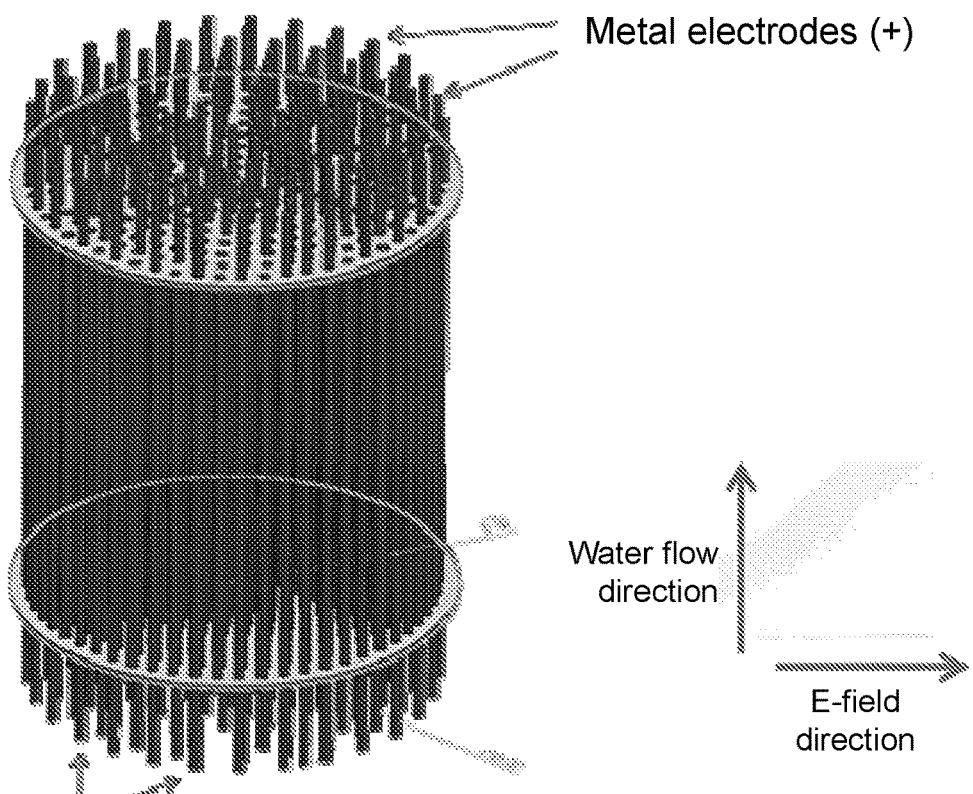
FIG. 2 is a schematic diagram showing a micro-engineered multi-rod electrode system with the installation showing water flow direction perpendicular to the E-field direction.

FIG. 2 is a non-limiting schematic diagram showing a micro-engineered multi-rod electrode system (Design 2).

The system is installed such that the direction of electric field is perpendicular to the direction of tap water flow. The electrodes are in the shape of rods with a diameter of 300 µm, but could also be thinner or thicker depending on the mechanical properties of the materials. The term "multi-rod electrode system" refers to an arrangement comprising a plurality of rod-shaped electrodes. The electrodes could also be in the form of twisted wires, hollow rods, flat plates and rods of different cross-sectionals, including but not limited to, angular shapes with the purpose of creating intense electrical fields. The electrode materials in this non-limiting example are metals or their alloys, particularly stainless steel, aluminum, brass, titanium and tungsten. It could also be contemplated that the electrode materials could be conducting carbons, polymers, ceramics and intermetallics, including composites and coating thereof.

The assembly of the multi-rod electrode system is accomplished using a holding plate, through which half the electrodes are inserted through the top plate and imbedded part-way in the bottom plate. This creates the positive electrodes. The other half of the electrodes are inserted through the bottom plate and imbedded part-way in the top plate to create the negative electrodes as shown in FIG. 2. The distance between the electrodes (i.e., the micro gap dimension/distance) should be less than 300 µm. In an alternative embodiment, the distance is 100 µm or less.

The overall dimension of the electrode system is from about 10 mm to about 30 mm in diameter, and from about 10 mm to about 50 mm in height, although this is a non-limiting example and other dimensions are contemplated. In more specific embodiments, the electrode system is from about 10 mm and about 15 mm in diameter. In certain embodiments, the electrode system is from about 20 mm to about 40 mm in height.

Example 3: Micro-Engineered Coated-Electrode System (Design 3, Perpendicular Electric Field)

Figure 3:
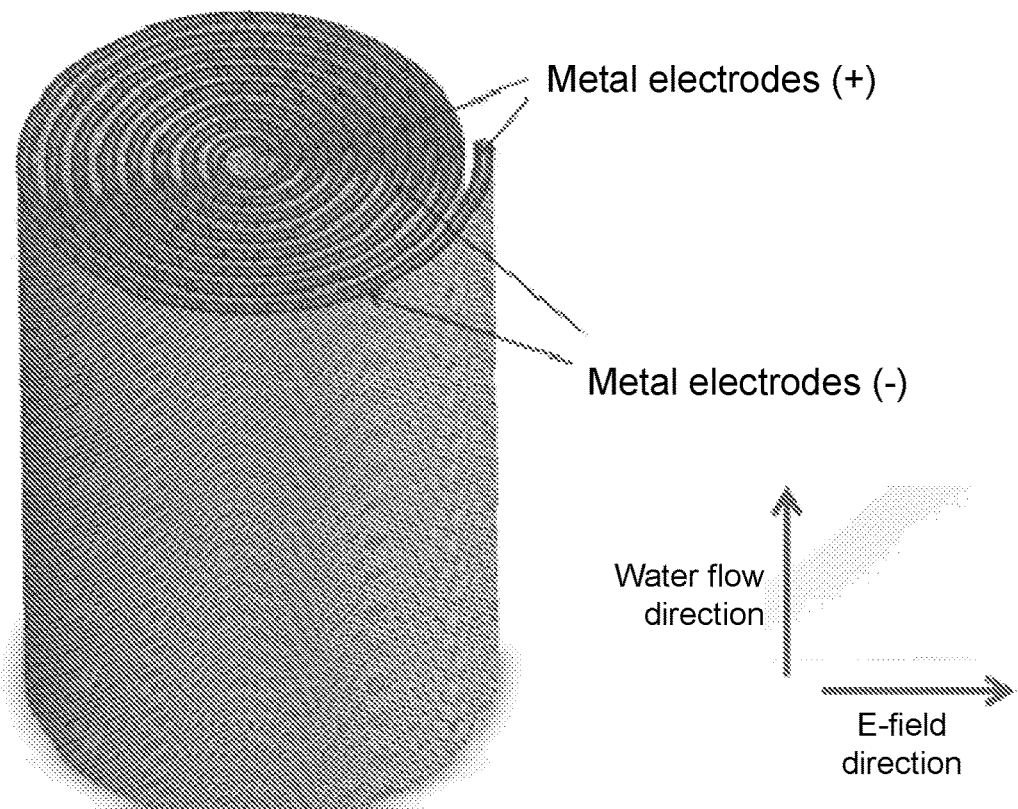
FIG. 3 is a schematic diagram showing a micro-engineered coated-electrode system with the installation showing water flow direction perpendicular to the E-field direction.

FIG. 3 is a non-limiting schematic diagram showing a micro-engineered coated electrode system (Design 3). The system is installed such that the direction of electric field is perpendicular to the direction of tap water flow. The electrodes in this non-limiting example are in the form of a mesh, but could also be in the form of screen, perforated plates or foils, porous plates and foils, fabrics, papers, micropatterned foils or any materials containing through porosity. Mesh sizes ranging from about 20 mesh to about 200 mesh are suitable. In certain embodiments the mesh size are 40 mesh, 50 mesh or 100 mesh. The electrode materials in this non-limiting example are metals or their alloys, particularly stainless steel, aluminum, brass, titanium and tungsten. It is also contemplated that the electrode materials could be conducting carbons, polymers, ceramics and intermetallics, including composites and coating thereof.

A protective coating of less than 100 µm is deposited on the surface of the electrode by electrophoretic deposition (e.g., electropolymerization, anodizing or E-coating) depending on the electrode material. The two coated electrodes are rolled together to give a spiral-wound electrode configuration shown in FIG. 3. One of the electrodes is the positive electrode and the other one is the negative electrode. The overall dimension of the electrode is 10 mm in diameter and 20 mm in height, although this is a non-limiting example and other dimensions are contemplated.

Example 4: Micro-Engineered Printed Electrode System (Design 4, Perpendicular Electric Field)

Figure 4:
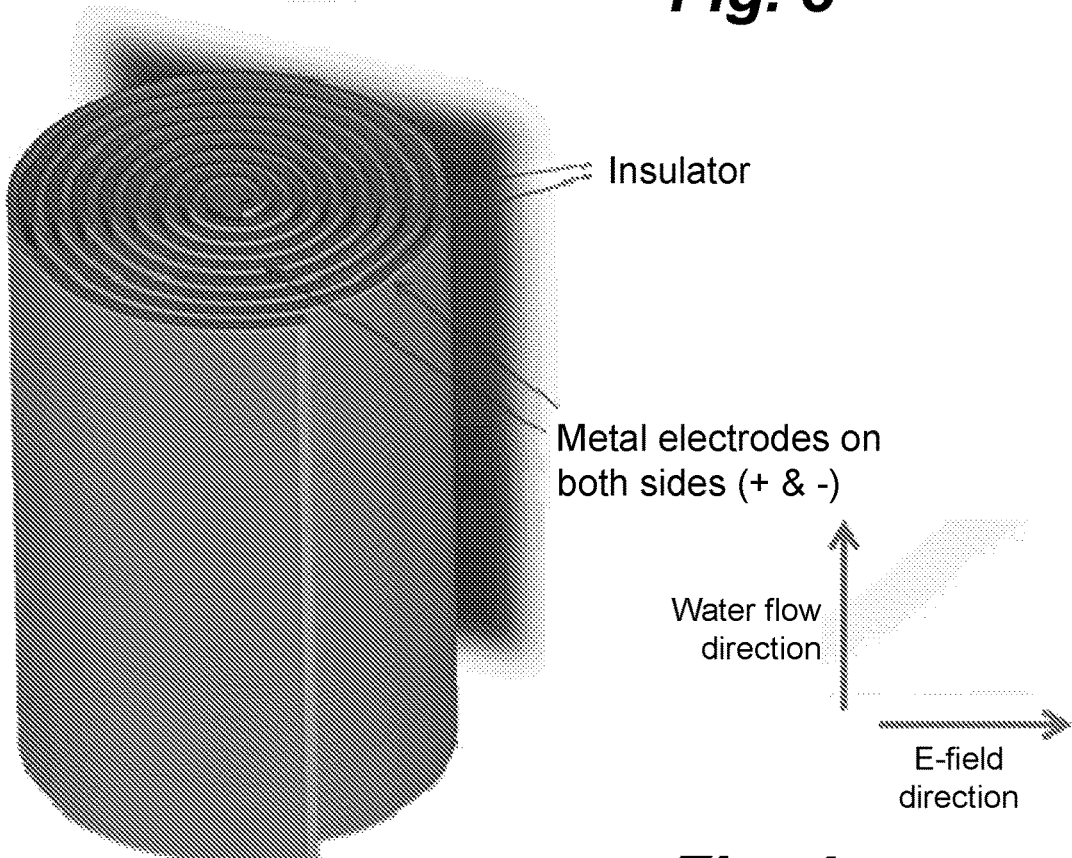
FIG. 4 is a schematic diagram showing a micro-engineered printed electrode system with the installation showing the water flow direction perpendicular to the E-field direction.

FIG. 4 is a non-limiting schematic diagram showing a micro-engineered printed electrode system (Design 4). The system is installed such that the direction of electric field generated is perpendicular to the direction of tap water flow. The electrodes (FIG. 5) are printed on a flexible substrate. Materials useful as the flexible substrate include, without limitation plastics, fabrics, and insulated metal foils. The printed electrodes have a size of 50 µm and a micro-gap distance of 50 µm. For the electrodes pattern A in FIG. 5, the electrodes are printed on both sides of the substrate so that the positive electrodes are on one side and the negative electrodes are on the other side. For the electrodes pattern B and C, parallel positive and negative electrode patterns are printed on both surfaces of the substrate. The electrode materials in this non-limiting example are metals or their alloys, particularly stainless steel, aluminum, brass, titanium and tungsten. It is also contemplated that the electrode materials be conducting carbons, polymers, ceramics and intermetallics, including composites and coating thereof.

A porous barrier made of insulating material with a maximum thickness of 100 µm is used to create a micro-gap between the electrodes as shown in FIG. 4. In an alternative embodiment, a non-electrical conducting protective layer of less than 100 µm could be deposited on the electrode surface by E-coating process, so that the porous barrier could be omitted. The printed electrode substrate with or without the porous barrier are rolled together to give a spiral-wound electrode configuration shown in FIG. 4. The overall dimension of the electrode is 10 mm in diameter and 10 mm in height, although this is a non-limiting example and other dimensions are contemplated.

Example 5: Micro-Engineered Porous Electrode System (Design 1, Parallel Electric Field)

Figure 6:
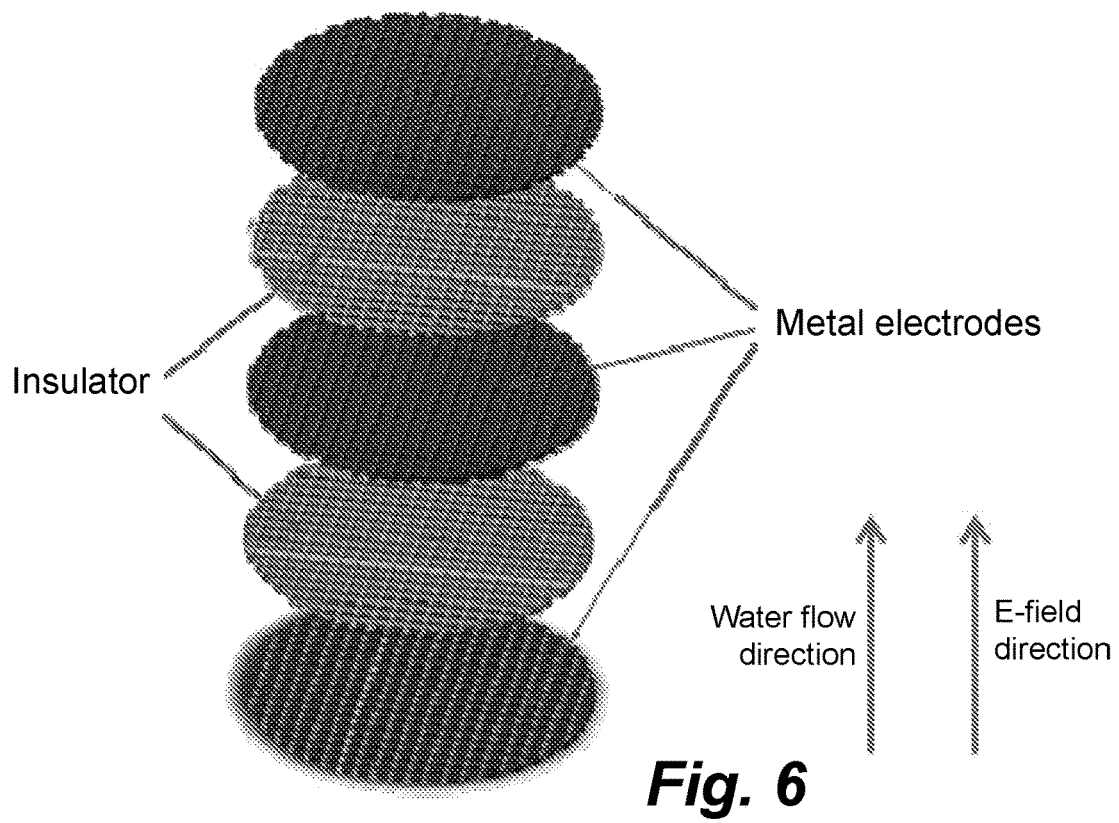
FIG. 6 is a schematic diagram showing a micro-engineered porous electrode system with the installation showing water flow direction parallel to the E-field direction.

FIG. 6 shows a non-limiting schematic diagram of a micro-engineered porous electrode system (Design 1). The system is installed such that the direction of electric field is parallel to the direction of tap water flow. The electrodes in this non-limiting example are in the form of a mesh, but could also be in the form of screen, perforated plates or foils, porous plates and foils, fabrics, papers, micropatterned foils or any materials containing through porosity. Mesh size of 40 mesh, 50 mesh and 100 mesh are suitable. The electrode materials in this non-limiting example are metals or their alloys particularly stainless steel, aluminum, brass, titanium and tungsten. It is also contemplated that the electrode material could be conducting carbons, polymers, ceramics and intermetallics including composites and coating thereof.

A porous barrier made of insulating material with a maximum thickness of 100 µm is used to create a micro-gap between the electrodes as shown in FIG. 6. In alternative, the barrier could be a non-electrical conducting protective layer of less than 100 µm deposited on the electrodes surface by an electrophoretic deposition process (e.g., electropolymerization, anodization or E-coating) depending on the electrode material, so that the physical barrier could be omitted. The micro-engineered electrodes can have a minimum of two electrodes with a separator, but more electrode-separator pairs are contemplated. The number of electrode-separator pairs are constrained mainly by the optimal overall thickness of 10 mm and water pressure drop of not more than 10%. An example of micro-engineered electrodes comprises up to 20 electrode-separator layers with diameter of 10 mm and thickness of 10 mm.

Example 6: Micro-Engineered Multi-Rod Electrode System (Design 2, Parallel Electric Field)

Figure 7:
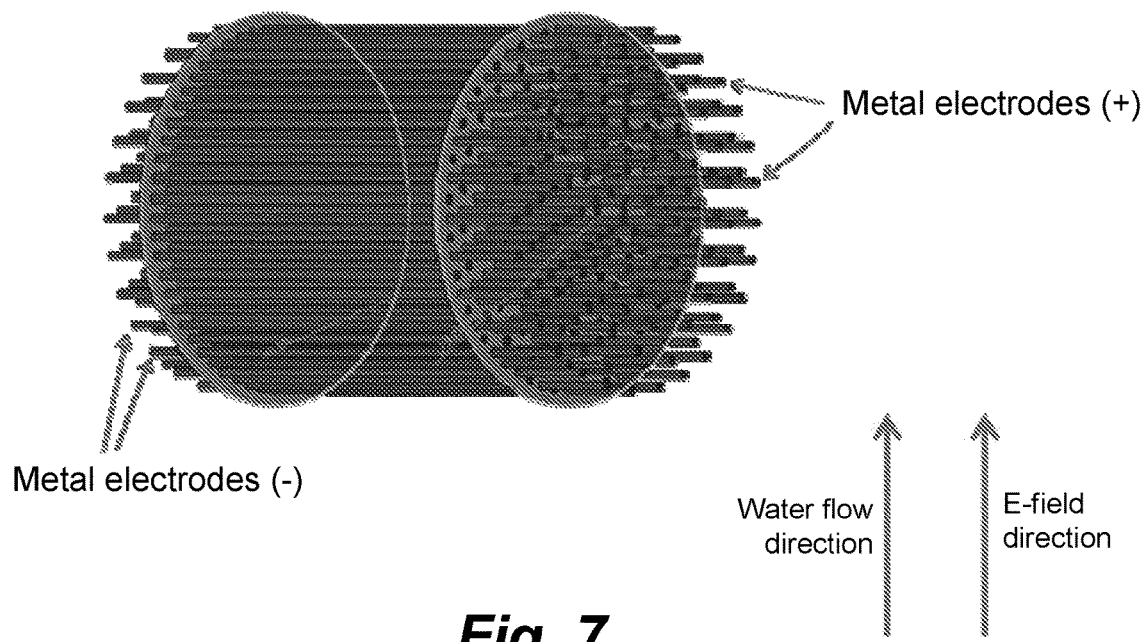
FIG. 7 is a schematic diagram showing a micro-engineered multi-rod electrode system with the installation showing water flow direction parallel to the E-field direction.

FIG. 7 is a non-limiting schematic diagram showing a micro-engineered multi-rod electrode system (Design 2).

The system is installed such that the direction of electric field is parallel to the direction of tap water flow. The electrodes are in the shape of rods with a diameter of 300 µm, but could also be thinner or thicker depending on the mechanical properties of the materials. The electrodes could also be in the form of twisted wires, hollow rods, flat plates and rods of different cross-sectionals including, but not limited to, angular shapes with the purpose of creating intense electrical fields. The electrode materials in this non-limiting example are metals or their alloys, particularly stainless steel, aluminum, brass, titanium and tungsten. It is also contemplated that the electrode materials could be conducting carbons, polymers, ceramics and intermetallics, including composites and coating thereof.

The assembly of the multi-rod electrode system is accomplished using a holding plate, through which half the electrodes are inserted through the top plate and imbedded part-way in the bottom plate. This creates the positive electrodes. The other half of the electrodes are inserted through the bottom plate and imbedded part-way in the top plate to create the negative electrodes as shown in FIG. 7. The distance between the electrodes should be less than 300 µm. In an alternative embodiment, the distance is 100 µm or less. The overall dimension of the electrode system is 10 mm in diameter and 10 mm in height, although this is a non-limiting example and other dimensions are contemplated.

Example 7: Micro-Engineered Coated-Electrode System (Design 3, Parallel Electric Field)

Figure 8:
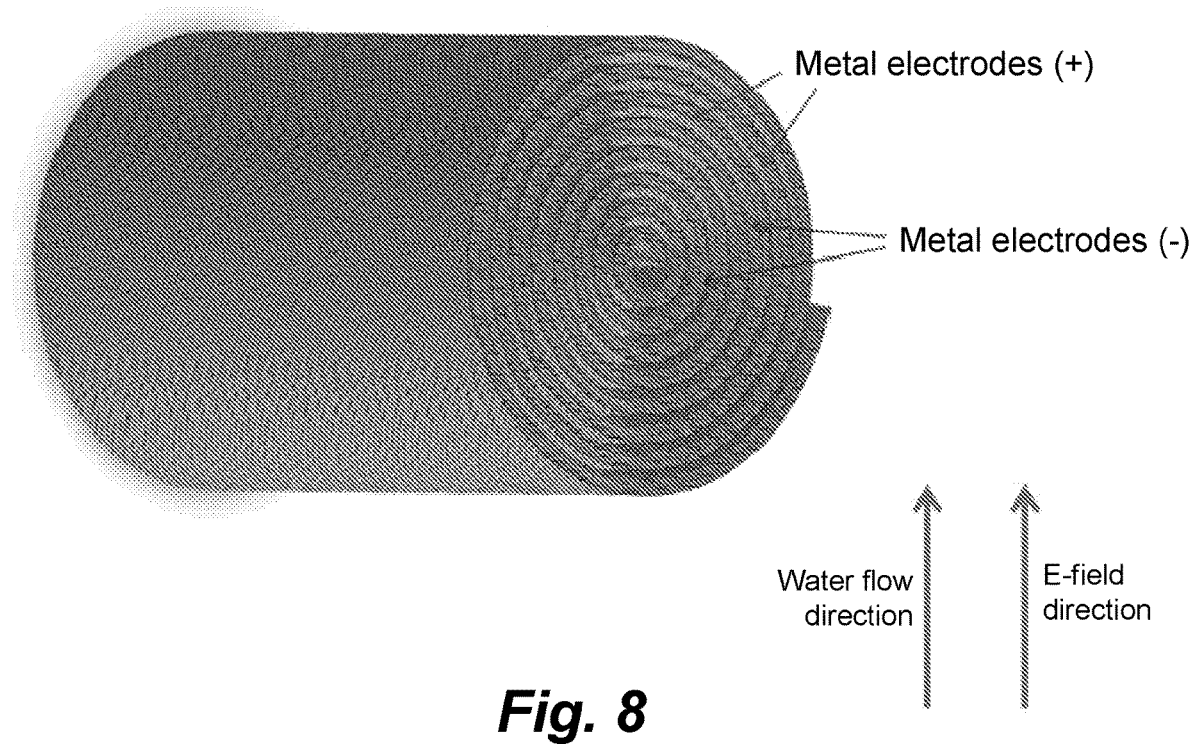
FIG. 8 is a schematic diagram showing a micro-engineered coated-electrode system with the installation showing water flow direction parallel to the E-field direction.

FIG. 8 is a non-limiting schematic diagram showing a micro-engineered coated-electrode system (Design 3). The system is installed such that the direction of electric field is parallel to the direction of tap water flow. The electrodes in this non-limiting example are in the form of a mesh, but could also be in the form of screen, perforated plates or foils, porous plates and foils, fabrics, papers, micropatterned foils or any materials containing through porosity. Mesh size of 40 mesh, 50 mesh and 100 mesh are suitable. The electrode materials in this non-limiting example are metals or their alloys, particularly stainless steel, aluminum, brass, titanium and tungsten. It is also contemplated that the electrode material could be conducting carbons, polymers, ceramics and intermetallics, including composites and coating thereof.

A protective coating of less than 100 µm is deposited on the surface of the electrode by an electrophoretic deposition process (e.g., electropolymerization, anodizing or E-coating) depending on the electrode material. The two coated electrodes are rolled together to give a spiral-wound electrode configuration shown in FIG. 8. One of the electrodes is the positive electrode and the other one is the negative electrode. The overall dimension of the electrode is 10 mm in diameter and 20 mm in height, although this is a non-limiting example and other dimensions are contemplated.

Example 8: Micro-Engineered Printed Electrode System (Design 4, Parallel Electric Field)

Figure 5:
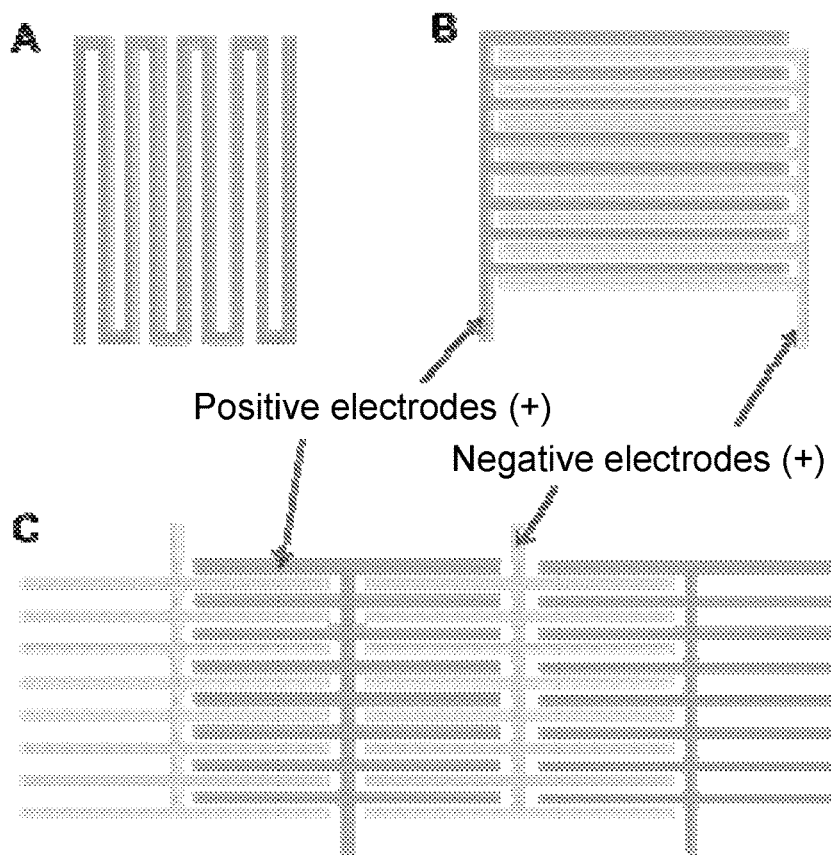
FIG. 5 is a schematic diagram showing printed electrodes on the substrate for micro-engineered printed electrode system.
Figure 9:
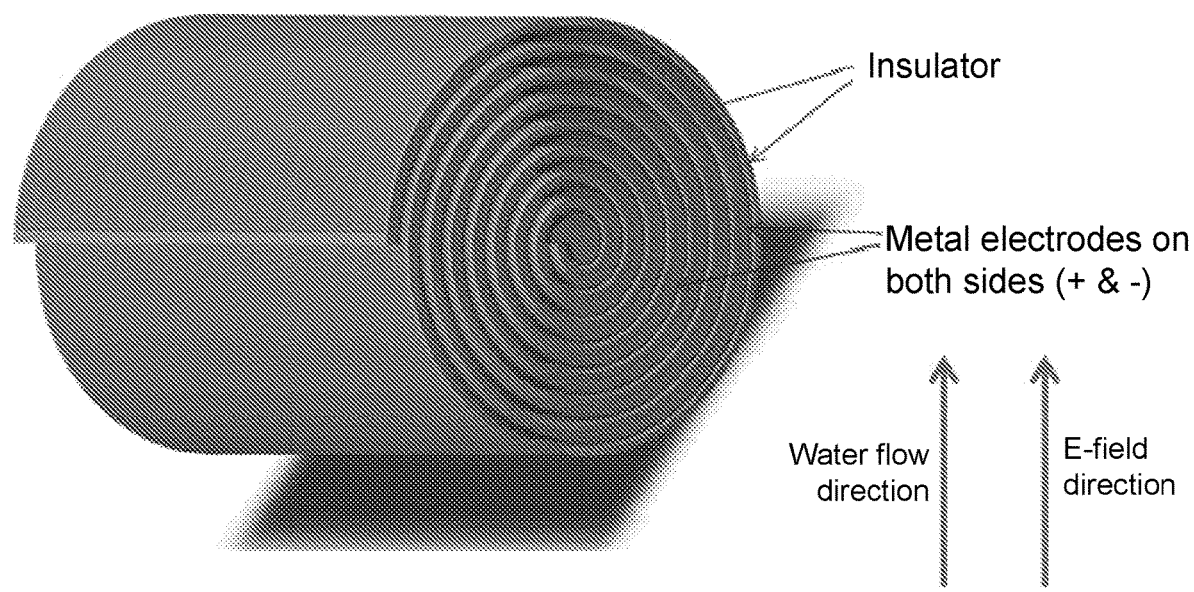
FIG. 9 is a schematic diagram showing a micro-engineered printed electrode system with the installation showing water flow direction parallel to the E-field direction.

FIG. 9 is a schematic diagram showing a micro-engineered printed electrode system (Design 4). The system is installed such that the direction of electric field generated is perpendicular to the direction of tap water flow. The electrodes (FIG. 5) are printed on a flexible substrate. Materials useful as the flexible substrate include, without limitation, plastics, fabrics, and insulated metal foils. The printed electrodes have a size of 50 µm and a micro-gap distance of 50 µm. The electrodes in pattern A shown in FIG. 5 are printed on both sides of the substrate such that the positive electrodes are one side and the negative electrodes are on the other side. For the electrodes pattern B and C, parallel positive and negative electrodes pattern are printed on both sides (surfaces) of the substrate. The electrode materials in this non-limiting example are metals or their alloys, particularly stainless steel, aluminum, brass, titanium and tungsten. It is also contemplated that the electrode materials could be conducting carbons, polymers, ceramics and intermetallics, including composites and coatings thereof.

A porous barrier made of insulating material with a maximum thickness of 100 µm is used to create a micro-gap between the electrodes as shown in FIG. 9. In an alternative embodiment, a non-electrical conducting protective layer of less than 100 µm could be deposited on the electrode surface by an E-coating process, so that the porous barrier could be omitted. The printed electrode substrate with or without the porous barrier is/are rolled together to give a spiral-wound electrode configuration shown in FIG. 9. The overall dimension of the electrode is 10 mm in diameter and 10 mm in height, although this is a non-limiting example and other dimensions are contemplated.

Example 9: Low-Voltage Pulsed Electric Field Circuit (Design 1)

Figure 10:
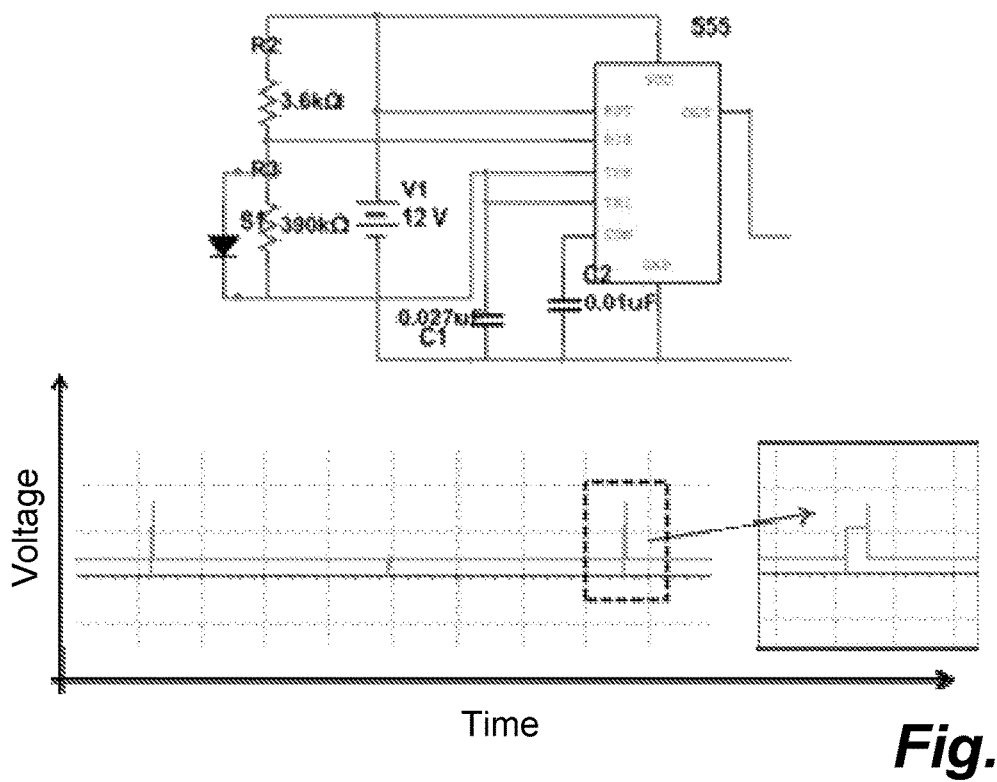
FIG. 10 is a schematic diagram showing a miniature pulsed electric field generator with its pulsed form generated by computer simulation.

FIG. 10 is a schematic diagram showing a low-voltage pulsed electric field circuit (Design 1). This design is using Timer (555) to generate a square wave pulse. Timer IC 555 consists of logic gates, flip flop amplifiers and transistors. When an input power is supplied, the amplifier acts as comparator to determine the on/off of the circuit. Flip flop then regulates the input signal with the help of the transistor and gives this IC a constant pulse output. Capacitors in the circuit are present to stabilize the circuit as well as to control the charging and discharging time of the pulse given by Timer IC. Thus pulse width and frequency of the output can be controlled.

Use of the Timer IC 555 provides a short-cut for low voltage pulse generator. It can be appreciated by a skilled artisan that without the Timer IC 555, a few more complex circuits, e.g., logic gates, flip flop and amplifier, would be required in order to replace the built-in design of the Timer IC 555. However, these additional circuits would make the whole circuit large and bulky in size, and therefore challenging or even impossible to achieve a mini and portable finished device.

Pulse width is a critical parameter determining the disinfection performance. Pulse frequency and pulse width are interrelated and a mixture of different pulse widths gives a better disinfection performance. The pulse width and pulse frequency can be adjusted by changing the values of resistors and capacitors in the circuit. Different frequencies and pulsed widths are required for different disinfection environments.

In this design, typically, a pulse frequency of 75 Hz and pulse width of 85 microseconds (µs) is generated. For each of the low-voltage generator circuits disclosed herein, the pulse frequency is set in the range of from about 1 Hz to about 100 kHz and the pulse width ranges from about 20 nanoseconds (ns) to about 100 milliseconds (ms) for achieving effective disinfection. In certain embodiments, the pulse frequency is from about 80 Hz to about 100 Hz and the pulse width is from about 50 (µs) to 1 ms.

Example 10: Low-Voltage Pulsed Electric Field Circuit (Design 2)

Figure 11:
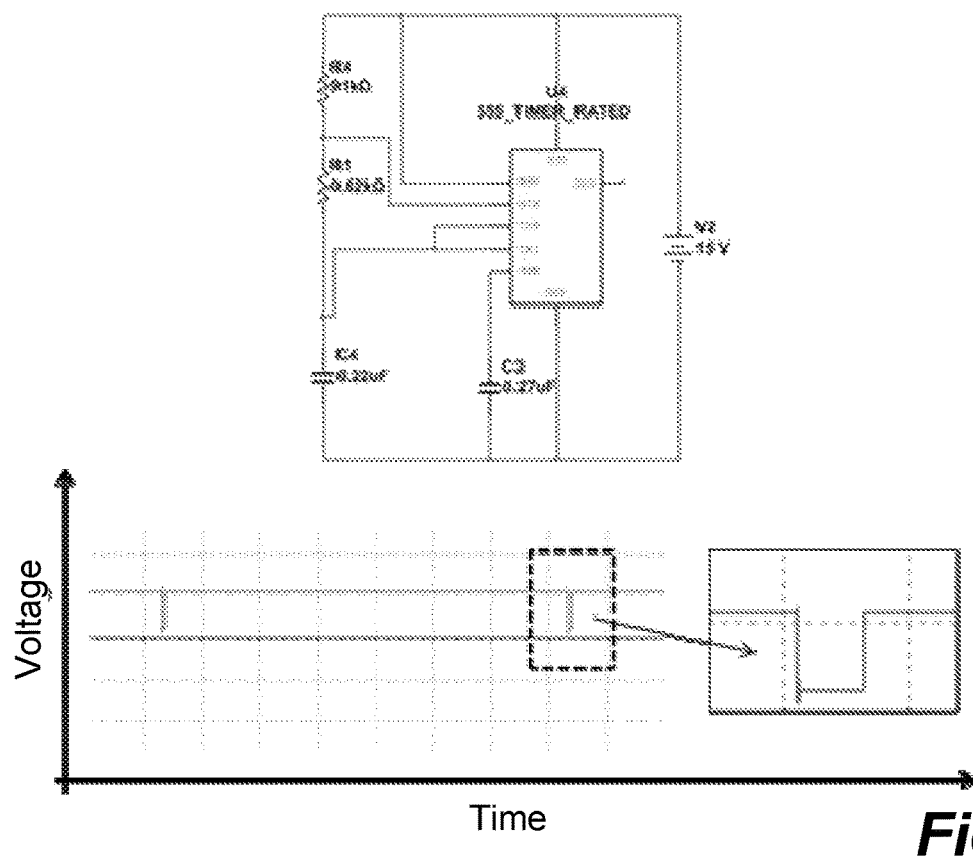
FIG. 11 is a schematic diagram showing a circuit design of miniature pulsed electric field generator with its pulsed form generated by computer simulation.

FIG. 11 is a schematic diagram showing a low-voltage pulsed electric field circuit (Design 2). This design is using Timer (555) to generate square wave pulse. Timer IC 555 consists of logic gates, flip flop amplifiers and transistors. When input power is supplied, the amplifier acts as comparator to determine the on/off of the circuit. Flip-flop then regulate the input signal with the help of the transistor and gives this IC a constant pulse output. Capacitors in the circuit are to stabilize the circuit as well as to control the charging and discharging time of the pulse given by Timer IC. Thus pulse width and frequency of the output can be controlled. This is the short-cut for low voltage pulse generator. The pulse width and wave frequency are adjustable by changing the values of resistors and capacitors in the circuit. In certain embodiments, the circuit can generate a high voltage negative pulse with duration less than 100 µs if suitable capacitors and resistors are used. In this design, typically, negative pulse with frequency of 70 Hz and pulse width of 104 µs is generated.

Example 11: Low-Voltage Pulsed Electric Field Circuit (Design 3)

Figure 12:
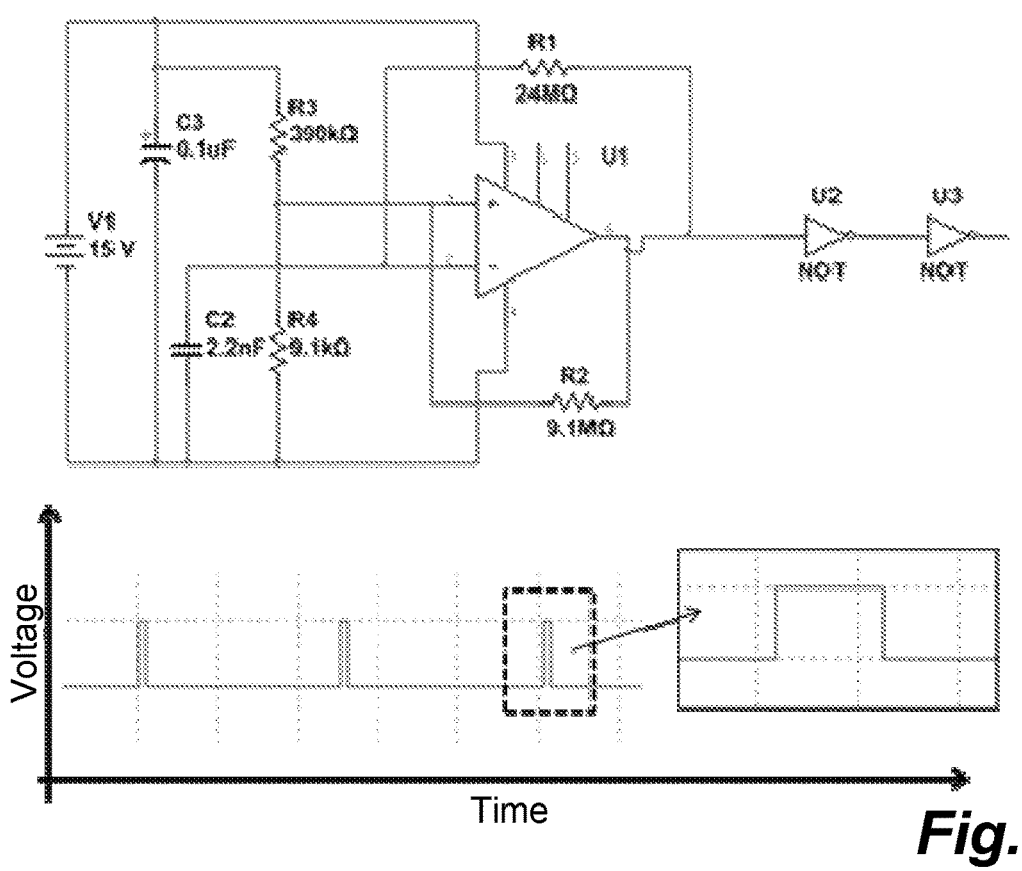
FIG. 12 is a schematic diagram showing a circuit design of miniature pulsed electric field generator with its pulsed form generated by computer simulation.

FIG. 12 is a schematic diagram showing a low-voltage pulsed electric field circuit (Design 3). This circuit uses operational amplifier to generate square wave pulse. $R_1$, $R_2$, $R_3$, $R_4$ all are involved in controlling the frequency and pulse width. $R_1$ and $R_2$ are the feedback design which helps stabilize and control the output range so that the circuit can be stable. $C_2$ is the key component determining the frequency. The larger the value $C_2$ has, the longer the discharging time $C_2$ will be, so the frequency will be shorter. By adding appropriate capacitors and resistors, the circuit generates almost perfect square pulse with short duration. To generate a perfect square waveform pulse when few hundred microseconds of pulse width is desired, logic gates are added to reshape the pulse generate. In this design, typically, pulse with frequency of 80 Hz and pulse width of 200 µs is generated.

Example 12: Using a Micro-Engineered Porous Electrode System with Initial E. coli Concentration $10^4$ CFU/ml, Pulse Width of 100 µs, Pulse Frequency of 100 Hz and Input Voltage of 5 V Micro-engineered porous electrode system is used for the disinfection of tap water containing $10^4$ CFU/ml of E. coli. Voltage input of 5 V to low-voltage pulsed electric field circuit generates a pulse with frequency of 100 Hz and width of 100 µs. The pulse electric field intensity is therefore 0.5 kV/cm. In this embodiment, reduction of 90% of E. coli in the tap water is achieved.

Example 13: Using a Micro-Engineered Porous Electrode System with Initial E. coli Concentration $10^4$ CFU/ml, Pulse Width of 100 µs, Pulse Frequency of 100 Hz and Input Voltage of 10 V Micro-engineered porous electrode system is used for the disinfection of tap water containing $10^4$ CFU/ml of E. coli. Voltage input of 10 V to low-voltage pulsed electric field circuit generates a pulse with frequency of 100 Hz and width of 100 µs. The pulse electric field intensity is therefore 1 kV/cm. In this embodiment, reduction of 90% of E. coli in the tap water is achieved.

What is claimed is:

1. A tap-mounted device for point-of-use disinfection of water, said device comprising:
    a plurality of electrodes having a micro-gap between the electrodes, wherein the micro-gap has a micro-gap distance in the range of 10 µm to 300 µm, the electrodes selected from the group consisting of multi-rod electrodes and jelly-roll type electrodes;
    a control system; and
    a low-voltage pulsed electric field generator circuit responsive to the control system, to generate a low-voltage pulsed electric field (PEF) across the micro-gap of the electrodes to provide a voltage of about 5 V up to about 30 V across the micro-gap, thereby providing a pulsed electric field strength at a level effective to increase cell permeability and/or cause an irreversible damage to cells of microorganisms present in the water, wherein the micro-gap establishes a distance between the electrodes sufficient to provide a physical separation between the electrodes while permitting a sufficiently intense pulsed electric field generated across a micro-gap between the electrodes to achieve disinfection of drinking water;
    wherein the tap mounted device creates a fluid flow path from an inlet to an outlet and the fluid flow path passes through multiple electric fields;
    wherein the multi-rod electrodes comprise a plurality of positive electrode rods and a plurality of negative electrode rods arranged in a three dimensional array, wherein an area between the electrode rods is open; and
    wherein the jelly-roll type electrodes have multiple fluid flow paths that run traverse to an axis of the electrodes and each fluid flow path passes through multiple electric fields, the jelly-roll type electrodes including a rolled-up substrate, wherein the substrate has positive and negative electrodes on each side.

2. The device of claim 1 further comprising:
    a power converter capable of providing a DC power output; and
    the power converter providing the DC power output to the low-voltage pulsed electric field generator circuit.

3. The device of claim 1, wherein the low-voltage pulsed electric field generator circuit provides an output pulse frequency in the range of about 1 Hertz (Hz) to about 100 Hz.

4. The device of claim 1, wherein the low-voltage pulsed electric field generator circuit provides a pulse width in the range of about 20 nanoseconds to about 100 milliseconds.

5. The device of claim 1, wherein the micro-gap has a micro-gap dimension from about 10 µm up to about 100 µm.

6. The device of claim 1, wherein the low-voltage pulsed electric field generator circuit generates a pulsed electric field strength of at least 0.5 kV/cm.

7. The device of claim 1, wherein the low-voltage pulsed electric field generator circuit generates an electric field having a pulsed waveform selected from the group of square, sinusoidal, trapezoidal and triangular.

8. The device of claim 1, wherein the electrodes are installed so as to generate an electric field in a direction which is perpendicular or parallel to a water flow between the electrodes.

9. The device of claim 1, wherein the electrodes are made of a conducting material or a carbon-based material.

10. The device of claim 1, wherein the electrodes are coated with a conducting material or a carbon-based material.

11. The device of claim 1, wherein the electrodes are coated electrodes.

12. The device of claim 1, wherein the electrodes are printed electrodes, and the electrodes are printed on both sides of a substrate with the positive electrodes on one side and the negative electrodes on the other side, wherein the substrate is rolled up into a jelly-roll type electrode.

13. The device of claim 1, wherein the negative electrode rods are attached to a negative holding plate at one end and the positive electrode rods are attached to a positive holding plate at one end, wherein the electrode rods are aligned parallel to each other with the positive holding plate on one side of the array and the negative holding plate on the other side of the array.

14. The device of claim 1, wherein a complete perimeter of the electrode rods is directly exposed to the fluid flow path.

15. A method for point-of-use disinfection of water comprising:
providing a plurality of electrodes having a micro-gap between the electrodes, wherein the micro-gap has a micro-gap distance in the range of 10 μm to 300 μm, the electrodes comprising electrodes selected from the group consisting of multi-rod electrodes and jelly-roll type electrodes;
providing a control system;
providing a low-voltage pulsed electric field generator circuit responsive to the control system; and
generating the pulsed electric field (PEF), across the micro-gap of the electrodes to provide a voltage of about 5 V up to about 30 V across the micro-gap, thereby providing a pulsed electric field strength at a level effective to increase cell permeability and/or achieve an irreversible breakdown of cells of microorganisms present in the water, wherein the micro-gap establishes a distance between the electrodes sufficient to provide a physical separation between the electrodes while permitting a sufficiently intense pulsed electric field generated across a micro-gap between the electrodes to achieve disinfection of drinking water;
wherein the tap mounted device creates a fluid flow path from an inlet to an outlet and the fluid flow path passes through multiple electric fields;
wherein the electrodes are multi-rod electrodes which comprise a plurality of positive electrode rods and a plurality of negative electrode rods arranged in a three dimensional array, wherein the space between the electrode rods is open; and
wherein the jelly-roll type electrodes have multiple fluid flow paths that run traverse to an axis of the electrodes and each fluid flow path passes through multiple electric fields, the jelly-roll type electrodes including a rolled-up substrate, wherein the substrate has positive and negative electrodes on each side.

16. The method of claim 15 comprising providing a pulsed electric field strength of at least 0.5 kV/cm.

17. The method of claim 15, further comprising:
the generating the pulsed electric field (PEF) comprising providing a DC power output to the low-voltage pulsed electric field generator circuit.

18. The method of claim 15, further comprising using the low-voltage pulsed electric field generator circuit to provide an output pulse frequency in the range of about 1 Hertz (Hz) to about 100 Hz.

19. The method of claim 15, further comprising using the low-voltage pulsed electric field generator circuit to provide a pulse width in the range of about 20 nanoseconds to about 100 milliseconds.

20. The method of claim 15, further comprising:
using the low-voltage pulsed electric field generator circuit to provide an output pulse frequency in the range of about 1 Hertz (Hz) to about 100 Hz; and
using the low-voltage pulsed electric field generator circuit to generate a pulsed electric field strength of at least 0.5 kV/cm.

21. The method of claim 15, further comprising using the low-voltage pulsed electric field generator circuit to generate an electric field having a pulsed waveform selected from the group of square, sinusoidal, trapezoidal and triangular.

* * * * *